(12) United States Patent
Shah

(10) Patent No.: US 10,372,844 B2
(45) Date of Patent: Aug. 6, 2019

(54) EXPRESSING EXTENSIONS WITH CUSTOMIZED DESIGN TIME BEHAVIOR

(71) Applicant: Microsoft Technology Licensing, LLC, Redmond, WA (US)

(72) Inventor: Nitinkumar Shah, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1029 days.

(21) Appl. No.: 14/200,465

(22) Filed: Mar. 7, 2014

(65) Prior Publication Data
US 2015/0120272 A1    Apr. 30, 2015

Related U.S. Application Data

(60) Provisional application No. 61/896,414, filed on Oct. 28, 2013.

(51) Int. Cl.
G06Q 10/06 (2012.01)
G06F 17/50 (2006.01)

(52) U.S. Cl.
CPC ......... *G06F 17/5009* (2013.01); *G06Q 10/06* (2013.01); *G06F 2217/02* (2013.01)

(58) Field of Classification Search
CPC .. G06F 17/5009; G06F 2217/02; G06Q 10/06
USPC ......................................................... 703/22
See application file for complete search history.

(56) References Cited

U.S. PATENT DOCUMENTS

| | | | |
|---|---|---|---|
| 6,449,659 B1 | 9/2002 | Caron et al. | |
| 7,219,330 B2* | 5/2007 | Hogg | G06F 8/20 717/106 |
| 7,349,913 B2* | 3/2008 | Clark | G06F 17/30174 |
| 7,428,546 B2* | 9/2008 | Nori | G06F 17/30595 |
| 7,483,915 B2* | 1/2009 | Thompson | G06F 8/24 |
| 7,529,811 B2* | 5/2009 | Thompson | G06F 17/30595 707/999.005 |
| 7,962,436 B2* | 6/2011 | Brelage | G06Q 10/10 706/47 |
| 8,631,386 B2* | 1/2014 | Doshi | G06F 8/315 717/106 |
| 8,977,608 B2* | 3/2015 | Boehm | G06F 17/30383 707/722 |
| 9,075,616 B2* | 7/2015 | Duggal | G06F 8/35 |

(Continued)

OTHER PUBLICATIONS

"System. ComponentModel Namespaces", Published on: Oct. 11, 2013, Available at: http://msdn.microsoft.com/en-us/library/vstudio/gg145042(v=vs.100).aspx.

(Continued)

*Primary Examiner* — Juan C Ochoa
(74) *Attorney, Agent, or Firm* — Christopher R. Christenson; Kelly, Holt & Christenson PLLC

(57) ABSTRACT

A customization environment uses a customization system that models customizations to a base computer system. The customization system receives developer inputs that customize the design time behavior of a form control by modeling it with an extension model. Based on the developer inputs, the customization system generates an extension expression that expresses the design time behavior of the form control. The extension expression can express the design time behavior through the addition of attributes representing the design time behavior or through code authored in an extensibility framework.

14 Claims, 12 Drawing Sheets

(56) References Cited

U.S. PATENT DOCUMENTS

| | | | |
|---|---|---|---|
| 9,141,411 B2* | 9/2015 | Konersmann | G06F 9/44536 |
| 9,659,251 B2* | 5/2017 | Tang | H04L 41/00 |
| 2003/0004746 A1* | 1/2003 | Kheirolomoom | G06Q 10/10 |
| | | | 717/104 |
| 2010/0185954 A1 | 7/2010 | Simernitski et al. | |
| 2011/0276950 A1* | 11/2011 | Fisher | G06F 8/437 |
| | | | 717/140 |
| 2013/0085799 A1* | 4/2013 | Zhang | G06Q 10/00 |
| | | | 705/7.26 |
| 2014/0280484 A1* | 9/2014 | Klemenz | H04L 67/10 |
| | | | 709/203 |

OTHER PUBLICATIONS

Watkins, Damien, "Handling Language Interoperability with the Microsoft .NET Framework", Published on: Oct. 2000, Available at: http://msdn.microsoft.com/en-us/library/ms973862.aspx.

Esposito, Dino, "Custom Design-time Control Features in Visual Studio .NET", Published on: Sep. 13, 2008, Available at: http://msdn.microsoft.com/en-us/magazine/cc164048.aspx.

"Creating a Custom AJAX Control Toolkit Control Extender (C#)", Published on: May 12, 2009, Available at: http://www.asp.net/web-forms/tutorials/ajax-control-toolkit/getting-started/creating-a-custom-ajax-control-toolkit-control-extender-cs.

Lee, Wei-Meng, "Custornize and Extend Windows Forms Controls", Published on: Jan. 25, 2007, Available at: http://www.devx.com/dotnet/Article/33558.

* cited by examiner

EXPRESSING EXTENSIONS WITH CUSTOMIZED DESIGN TIME BEHAVIOR

CROSS-REFERENCE TO RELATED APPLICATION

The present application is based on and claims the benefit of U.S. provisional patent application Ser. No. 61/896,414, filed Oct. 28, 2013, the content of which is hereby incorporated by reference in its entirety.

BACKGROUND

Computer systems are currently in wide use. Some computer systems are relatively large, and may include, for instance, thousands of different forms and other user interface and data entities (such as tables). Such computer systems are often customized (and some heavily customized) before they are deployed in a given implementation.

By way of example, some large computer systems include business systems. Such business systems may include, for instance, enterprise resource planning (ERP) systems, customer relations management (CRM) systems, line-of-business (LOB) systems, among others. These types of business systems often include many thousands of different forms, each of which may have many different controls and other user interface elements. Such systems also commonly include a great deal of business logic, as well as work flows, that allow users to access the system and perform a set of activities, or tasks, in order to carry out their duties in conducting a particular business for which they are working.

When such a business system is deployed in a specific business, it is common for the business system to be highly customized in order to meet the functional requirements of the particular business in which it is deployed. By way of example, different businesses may wish to have different form controls on a given form that represents a customer entity. In addition, different organizations may wish to have different business logic or other items on an expense report form. Thus, it can be seen that a given business system may be heavily customized so that it meets the requirements of the given organization that is using it.

A business system may also have multiple different layers of customization. For instance, a software company that has created and developed the basic system may simply sell the business system as a base product. An independent software vendor (ISV) may then generate a set of customizations to the base product, so that the base product can be resold with those customizations. A value added reseller (VAR) may add another layer of customizations, and the ultimate end user of the product may be in a partnership with a development partner, where the development partner adds their own customizations.

In making such customizations, it may be that a given developer wishes a particular extension that he or she is creating to have customized design time behavior. Design time behavior can be distinguished from runtime behavior. For instance, it may be that a developer can configure a form control so that, during runtime, it is either visible or invisible, based upon the specific configuration. However, regardless of the configuration, it may be that the developer wishes the form control to always be visible during design time. Thus, its design time behavior may be different from its runtime behavior. Design time behavior of the form control is normally defined in system metadata in a base system.

Currently, when a developer or another programmer wishes to change the design time behavior of a form control, for instance, the developer somehow gains access to the system metadata. The developer makes the changes there, or the changes in design time behavior are not made.

The discussion above is merely provided for general background information and is not intended to be used as an aid in determining the scope of the claimed subject matter.

SUMMARY

A customization environment uses a customization system that models customizations to a base computer system. The customization system receives developer inputs that customize the design time behavior of a form control by modeling it with an extension model. Based on the developer inputs, the customization system generates an extension expression that expresses the design time behavior of the form control. The extension expression can express the design time behavior through the addition of attributes representing the design time behavior or through code authored in an extensibility framework.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
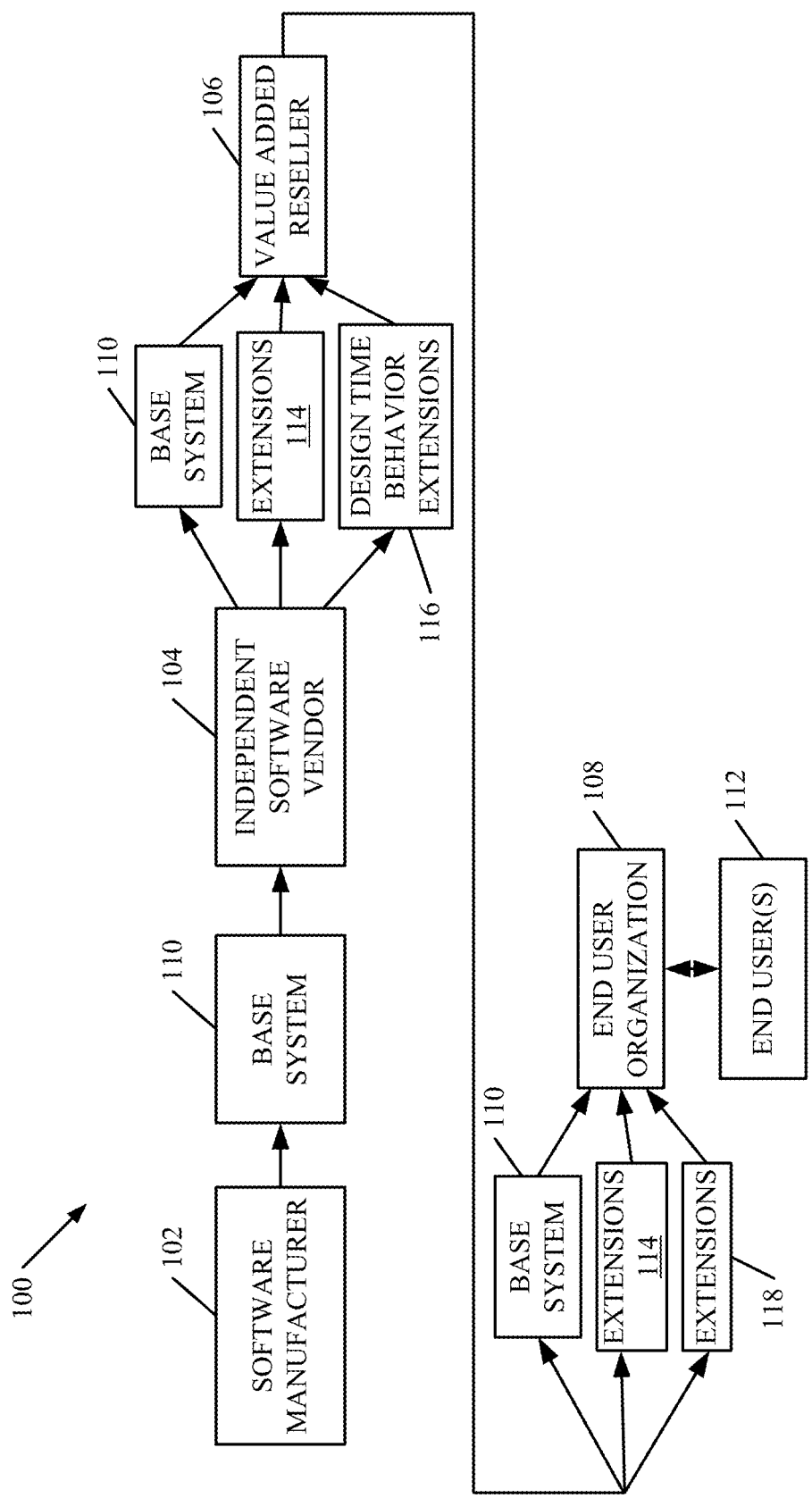
FIG. 1 is a block diagram of one illustrative development channel.

FIG. 1 is a block diagram of one illustrative development channel 100. Development channel 100 illustratively includes software manufacturer 102, independent software vendor (ISV) 104, value added reseller (VAR) 106 and end user 108. In one embodiment, software manufacturer 102 illustratively manufactures or authors a base software system 110. Software system 110 is eventually purchased by an end user organization 108 where it is accessed by one or more end users 112. However, before deploying the software system at the end user organization 108, it is illustratively customized to meet the functional requirements of end user organization 108.

Therefore, in one embodiment, ISV 104 illustratively customizes or extends base system 110. In the embodiment discussed herein, the discussion will proceed with respect to extensions to base system 110. Extensions illustratively add items or functionality (or both) to base system 110, without changing the underlying base system 110. However, it will be appreciated that customizations (which actually change the base system) could be made as well.

In any case, ISV 104 illustratively accesses base system 110 which contains models of various types. The types are illustratively abstract concepts within the base software system 110. For example, in a business system, the types can include forms, entities, tables, etc. Each of the types is illustratively modeled.

ISV 104 illustratively models extensions to base system 110. By way of example, assume that base system 110 includes a modeled type which represents a form. However, assume also that ISV 104 wishes to extend a particular form (such as the form that displays information representative of a customer) to include additional fields. As a specific example, assume that ISV 104 wishes to include two extra address fields in the form that represents a customer. In that case, ISV 104 generates an extension model that models the extension to a customer form. The extensions will illustratively include the two extra address fields. Thus, ISV 104 not only provides, at its output, base system 110, but also extension models that model extensions 114.

It may also be that ISV 104 wishes to model customized design time behavior for its extensions. By way of example, assume that a form includes a plurality of form controls. In one embodiment, ISV 104 is capable of not only generating an extension model that models extensions to the form controls, but also provide inputs to model specific design time behavior for those form controls. Assume, for instance, that a customer form that represents a customer in base system 110 is extended by ISV 104 to include an extra tab control. Assume also that ISV 104 generates extensions to customize the runtime of the extended tab control so that it can be either visible on the customer form, or invisible, based on some specific user settings. However, it may be that ISV 104 wishes the extended form control to have different design time behavior. By way of example, it may be that ISV 104 wishes the extended form control to be visible all the time (at design time), regardless of the particular user settings. In that case, ISV 104 can generate design time behavior extension models that model design time behavior extensions 116. Then, when a developer further down along the development channel 100 generates customizations, extensions, or performs further development, that developer will be able to view the extended form control with its design time behavior that was defined by ISV 104.

For instance, assume that VAR 106 wishes to customize the base system, with extensions 114 and 116, for use by end user organization 108. During that design phase, VAR 106 will be able to use the extended form control (the additional tab control on the customer form) added by ISV 104 as extension 114. The extended form control will behave (during the design time of VAR 106) with the design time behavior modeled by design time behavior extensions 116. Therefore, continuing with the same example discussed above, when VAR 106 is customizing the software system, the extended form control (the additional tab) will always be visible, because that is the particular design time behavior which ISV 104 has ascribed to it in the design time behavior models that model design time behavior extensions 116.

VAR 106 can thus provide, at its output, base system 110, along with extensions 114 that are generated and separately modeled by ISV 104, along with additional extensions 118 that are added by VAR 106. End user 108 has access to base system 110, as it is extended by extensions 114 and extensions 118.

In one embodiment, the base system 110 is unaltered by extensions 114 and 118. For instance, extensions 114 and 118 are modeled in extension models which are separate from, but associated with, base system 110. During compile time, the assemblies generated for base system 110 are independently loadable from the assemblies generated for extensions 114 and the assemblies generated for extensions 118. That is, not only are the extensions modeled separately from the base system (so that the extension models do not overwrite any of the models for the base system 110) but the assemblies generated for the base system are separately and individually loadable relative to the assemblies generated for the extensions.

Figure 2:
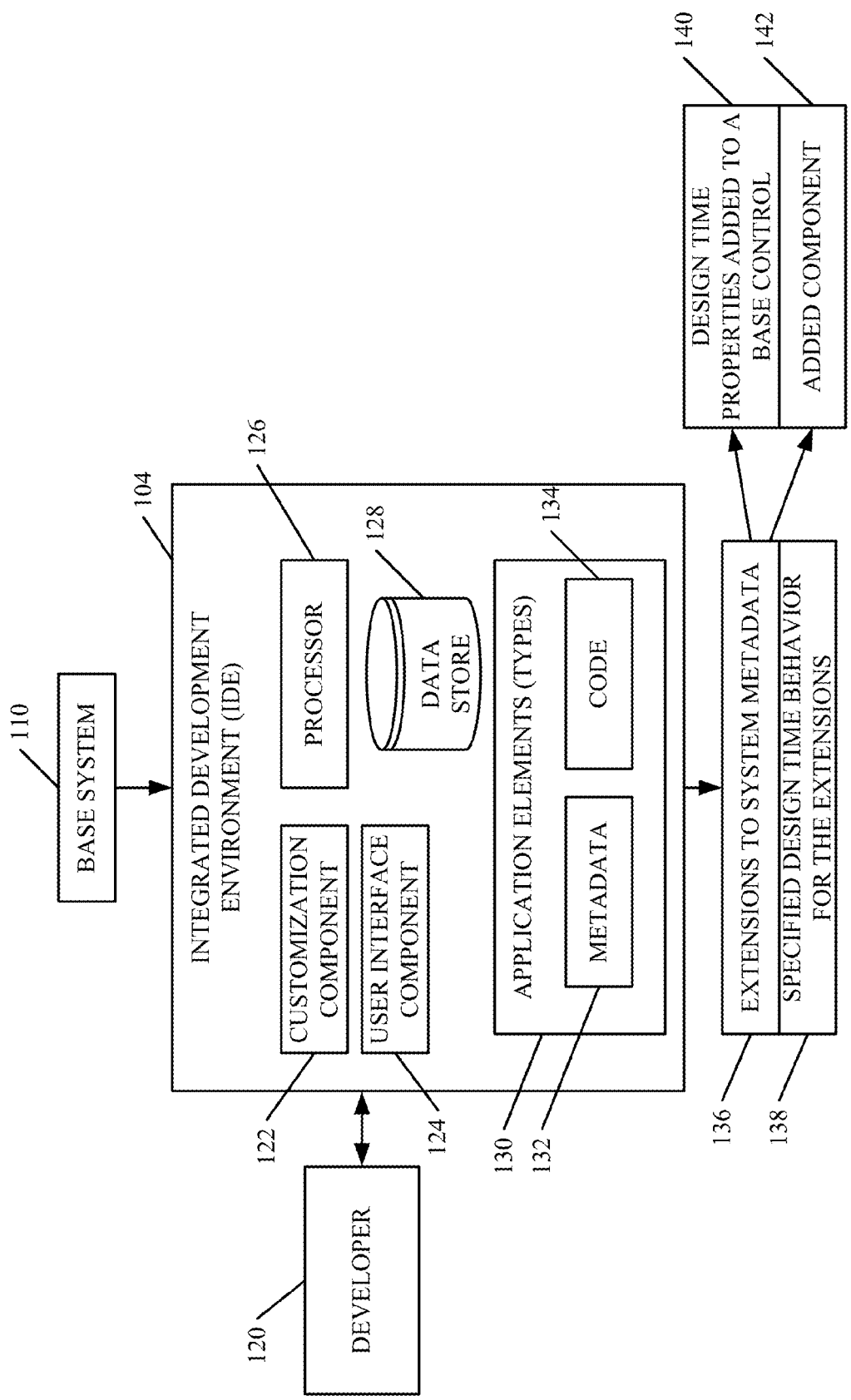
FIG. 2 is a block diagram of one illustrative integrated development environment (IDE).

FIG. 2 is a block diagram illustrating one embodiment of IDE 104 in more detail. FIG. 2 also shows that a developer 120 accesses base system 110 through IDE 104. FIG. 2 also shows that IDE 104 illustratively includes customization component 122, user interface component 124, processor 126, data store 128 and application elements (e.g., compilable types) 130. Application elements 130 illustratively include metadata 132 and optionally include code 134 as well. In the embodiment shown in FIG. 2, the application elements 130 are illustratively modeled by base system 110 so that metadata 132 is "system metadata" that is generated for base system 110. In addition, code 134 is system code that is generated for base system 110.

Processor 126 is illustratively a computer processor with associated memory and timing circuitry (not separately shown). It is a functional part of IDE 104 and is activated by, and facilitates the functionality of, other components and elements in IDE 104.

Data store 128 is shown as a single data store that stores items to facilitate the operation of IDE 104 in allowing developer 120 to customize or further develop system 110. It is shown as a single data store in FIG. 2, but it could be multiple data stores as well. In addition, while data store 128 is shown as being local to IDE 104, it can be remote from IDE 104 and accessed through a network or otherwise. Data store 128 can comprise multiple data stores, all of which can be local to IDE 104, all of which can be remote therefrom, or some of which can be local while others are remote.

The user interface displays generated by user interface component 124 illustratively include user input mechanisms that can be actuated by developer 120 to control and manipulate IDE 104. In one embodiment, the user input mechanisms can take a wide variety of different forms. For example, they can be icons, buttons, text boxes, check boxes, drop down menus, etc. In addition, they can be actuated in a wide variety of different ways as well. For instance, they can be actuated using a point and click device (such as a mouse or track ball), using a keyboard, using a virtual or hardware keyboard or keypad, using buttons, switches, a joystick, a thumb pad, etc. Further, where the display device on which user interface displays are shown is a touch sensitive screen, they can be actuated using touch gestures. Also, where IDE 104 (or the device that is displaying the user interface displays) includes speech recognition components, the user input mechanisms can be actuated using speech inputs.

In the example discussed with respect to FIG. 2, developer 120 uses customization component 122 to generate extensions 136 to system metadata 132 and to also specify design time behavior 138 for extensions 136. Customization component 122 illustratively generates user interface displays, using user interface component 124, with user input mechanisms that developer 120 can interact with in order to control and manipulate IDE 104 to make extensions 136, and to define design time behavior 138. In one embodiment, the extensions can be extensions to a property 140 or they can include an added component 142. This is described in greater detail below.

Developer 120 can for example, extend metadata 132 to obtain an extension model that allows the developer to define additional design time properties to the base control. The developer can also add components to the extended control. The components can have properties and can comprise other components. Developer 120 can also extend already extended controls that then inherit all the properties and components from all the base controls in base system 110.

Figure 3:
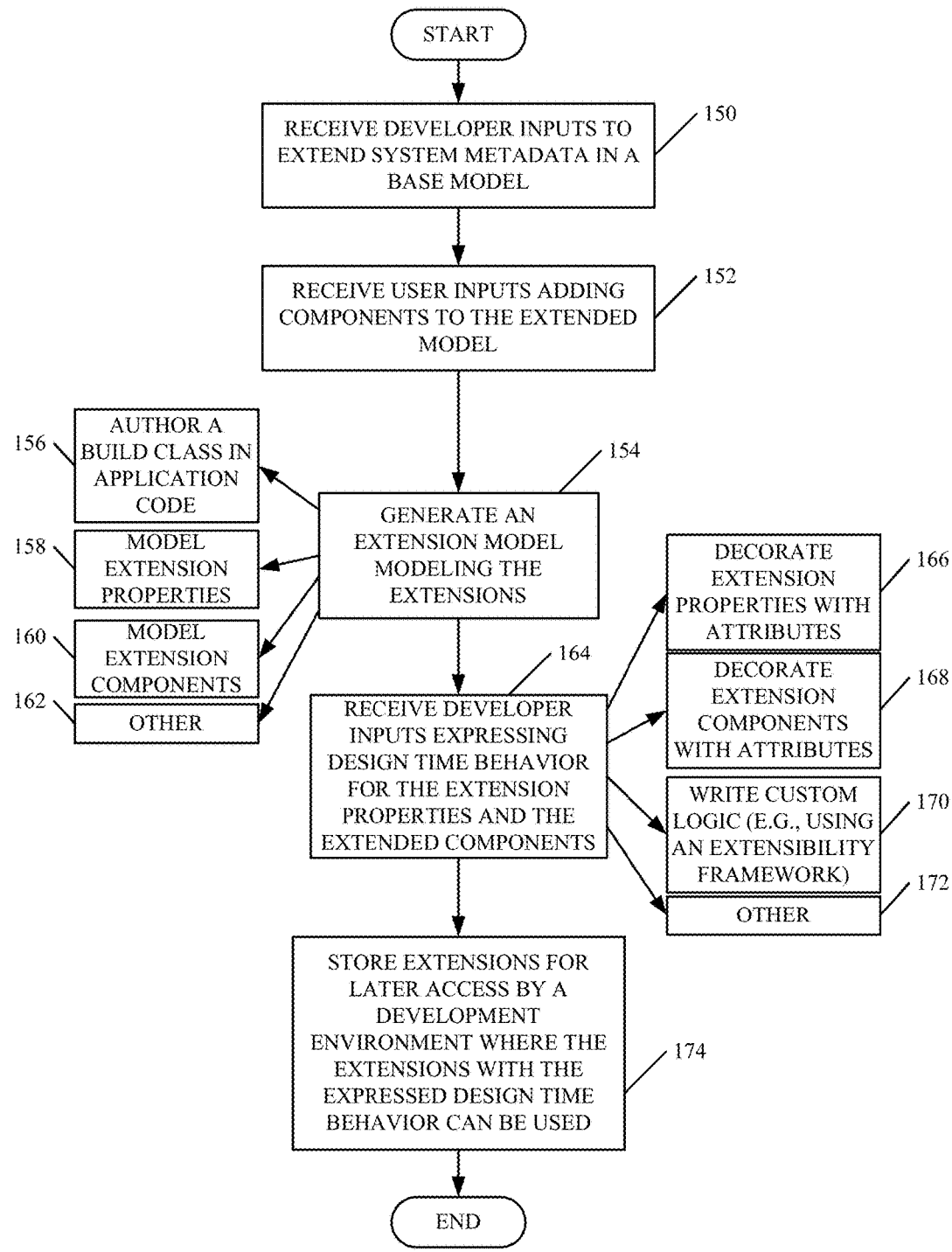
FIG. 3 is a flow diagram of one embodiment of the operation of the IDE in FIG. 2.

FIG. 3 is a flow diagram illustrating one embodiment of the operation of IDE 104 in allowing developer 120 to generate extensions 136 and 138 to application elements 130 of base system 110. FIGS. 2 and 3 will now be described in conjunction with one another.

Customization component 122 first receives developer inputs indicating that developer 120 wishes to extend system metadata 132 (or other data) in base system 110. By way of example, where an item in base system 110 is modeled, developer 120 indicates a particular model which developer 120 wishes to extend. Receiving developer inputs to extend the system metadata is indicated by block 150 in FIG. 3. Customization component 122 can also illustratively receive user inputs from developer 120 adding components to the extended model. By way of example, where developer 120 generates a model to extend a form control, developer 120 is not only able to extend the metadata for the form control, but can also add components to the extended control. The added components can have properties and can compose other components. Receiving user inputs adding components to the extended model is indicated by block 152 in FIG. 3.

Customization component 122 then generates an extension model that models the extensions defined by developer 120. This is indicated by block 154 in FIG. 3. The developer 120 can do this in a wide variety of different ways. In one embodiment, developer 120 authors a build class in application code. This is indicated by block 156 in FIG. 3. Customization component 122 can generate the extension model by modeling extension properties as indicated by block 158, and can also model extension components as indicated by block 160. Generating an extension model can be done in other ways as well, and this is indicated by block 162.

Customization component 122 then receives developer inputs expressing the design time behavior for the extension properties and the extended components. This is indicated by block 164 in FIG. 3. The design time behavior for the additional extension properties and components can be added in a number of different ways. In one embodiment, a number of common scenarios for design time behaviors can illustratively be modeled in application code. However, customization component 122 provides for the ability to author custom code as well.

Some of the common behaviors that may be attributed to the extensions, in design time, may be to allow a developer to perform standard lookups. For instance, the developer may wish to perform a data source lookup, a field or method lookup, an element list lookup (such as to obtain a list of tables, classes, etc.). The developer may also wish to obtain a list of classes that extend another class or interface. All of these different design time behaviors can be expressed by decorating an extension property with a desired attribute. This is indicated by block 166 in FIG. 3.

In addition, the types of components that can be added for a given component can be expressed with an attribute in application code as well. This is indicated by block 168 in FIG. 3.

Also, when developer 110 desires to use custom code to handle specific design time behavior, then customization component 122 allows developer 120 to write custom logic using, for example, the extensibility framework. This is indicated by block 170. By way of example, a managed extensibility framework component can be authored which implements the desired exposed interfaces. Developer 120 can write custom logic for lookups, or other behaviors, using the extensibility framework pattern. In addition, developer 120 can use custom logic to make extended form controls read only, or to hide certain properties based on a given state of the control.

It will be appreciated that developer 120 can express the design time behavior for the extension properties and extended components in other ways as well. This is indicated by block 172.

Once the design time behavior for the extended properties and components has been expressed, developer 120 can use customization component 122 to store the extensions for later access by a development environment where the extensions with the expressed design time behavior can be used. This is indicated by block 174 in FIG. 3. By way of example, it may be that developer 120 is an ISV 104. In that case, the extended form controls and their extended design time behavior can be stored for access by VAR 106 (shown in FIG. 1). Storing the extensions for later access by a different development environment is also contemplated herein as well.

A specific example will now be described to enhance understanding. The example allows a way for an application developer 120 to extend system metadata and also specify design time behavior for the system metadata extensions. The extension described herein will be used to extend form control system metadata.

In the example, in order to express the extensions and their design time behavior, developer 120 illustratively authors a build class in application code that provides information about the extensions to the control. The build class is identified by having a special class attribute on it. In the embodiment described herein, the special class attribute is referred to as "FormDesignControlAttribute" although others could be used. The build class can be parsed by the development environment to create the extension structures shown in FIGS. 4 and 5 for the control that is being extended. The extended set of metadata can be saved along with the standard metadata for the form control, and the attributes described therein provide basic design time behavior for the extended form control.

In the example being discussed, two sets of attributes can be used to decorate the extended properties of the build class. A first set of attributes includes the "FormDesignProperty" prefix. These attributes provide information about the properties. Examples of this can include a "FormDesignPropertyAttribute (display name, category name)" attribute which can be provided on every primitive property. A "FormDesignPropertyDataSourceAttribute" can be used to provide data source lookup to the property at design time. Another illustrative attribute is the "FormDesignPropertyDataFieldAttribute (data source prop name, field type)" which provides a data field lookup to the property. A "FormDesignPropertyDataMethodAttribute (data source prop name)" can be used to provide data method lookups to the property. Also, other attributes can be used as well.

Attributes with a "FormDesignComponent" prefix can be used to provide information about components. By way of example, a "FormDesignComponentAttribute (display name)" can be used to denote a singular component. A "FormDesignComponentCollectionAttribute (display name)" can be used to denote a collection component. A "FormDesignComponentValidChildAttribute (component type, display name)" can be used in conjunction with the collection attribute. It can denote the valid children types for the collection. "ComponentType" can be identified as the class name that is addable.

Figure 4:
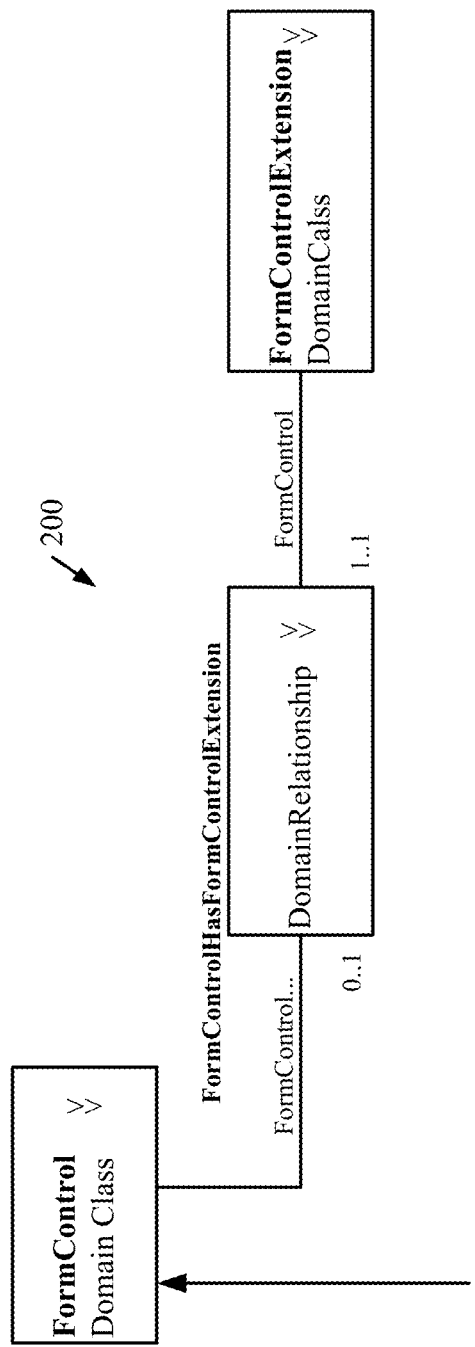
FIGS. 4 and 5 are exemplary entity diagrams.

FIG. 4 shows an entity diagram 200 that can be generated by parsing the build class with the attributes discussed above. FIG. 4 shows that a form control has a form control extension that, itself, can be extended.

Figure 5:
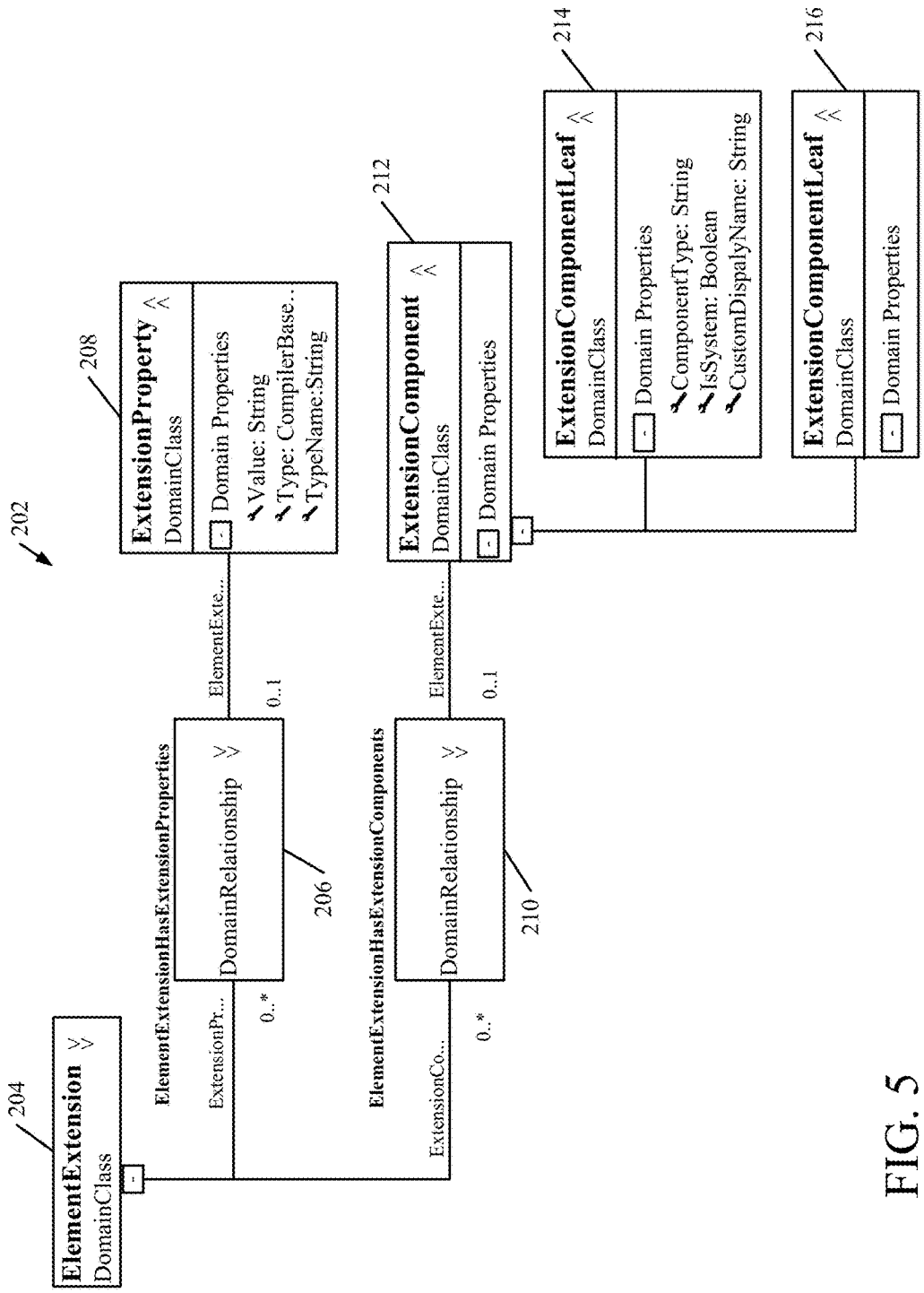

FIG. 5 shows an entity diagram 202 in which node 204 indicates that new properties can be added to a framework element. For instance, a new tab can be added as an extended form control.

Nodes 206 and 208 indicate that the element extension has extension properties, with node 208 listing the new properties. Nodes 210 and 212 indicate that new components can have other components, and indicates that the element extension node can have extension components as well. Nodes 214 and 216 indicate that the extension components can have other components or other properties.

FIGS. 4 and 5 are only exemplary entity diagrams that can be generated by parsing the structure that was authored by developer 120 to express the extensions to the base system and the design time behavior for those extensions. The entity diagrams are specifically built where the extension is expressed by a build class that expresses extensions to a form control, and the design time behavior for the extensions to the form control. However, it will be appreciated that this is only one example.

It can be seen, that customization component 122 in IDE 104 illustratively allows a way for developer 120 to extend system metadata and also to specify design time behavior 138 for the system metadata 136 extensions. This can be done by adding design time properties to a base control or to a component. It can also be done by authoring code using a managed extensibility framework, or other framework that allows extension of code in a base system.

Figure 6:
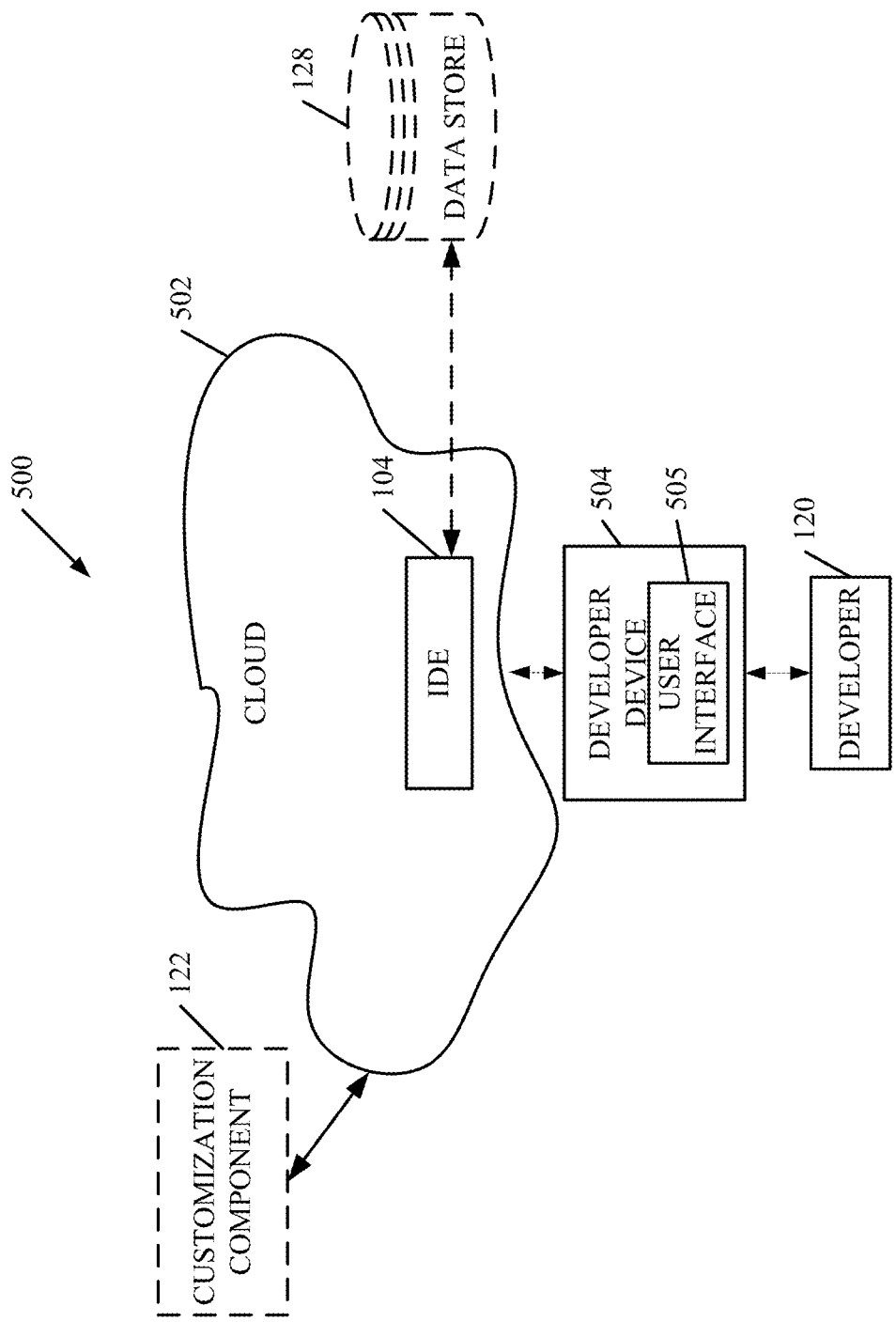
FIG. 6 shows one embodiment of the IDE in a cloud computing environment.

FIG. 6 is a block diagram of environment 104, shown in FIG. 2, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that IDE 104 is located in cloud 502 (which can be public, private, or a combination where portions are public while others are private). Therefore, developer 120 uses a developer device 504 that generates UI displays 505 to access those systems through cloud 502.

FIG. 6 also depicts another embodiment of a cloud architecture. FIG. 6 shows that it is also contemplated that some elements of IDE 104 are disposed in cloud 502 while others are not. By way of example, data store 128 can be disposed outside of cloud 502, and accessed through cloud 502. In another embodiment, customization component 111 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that IDE 104, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
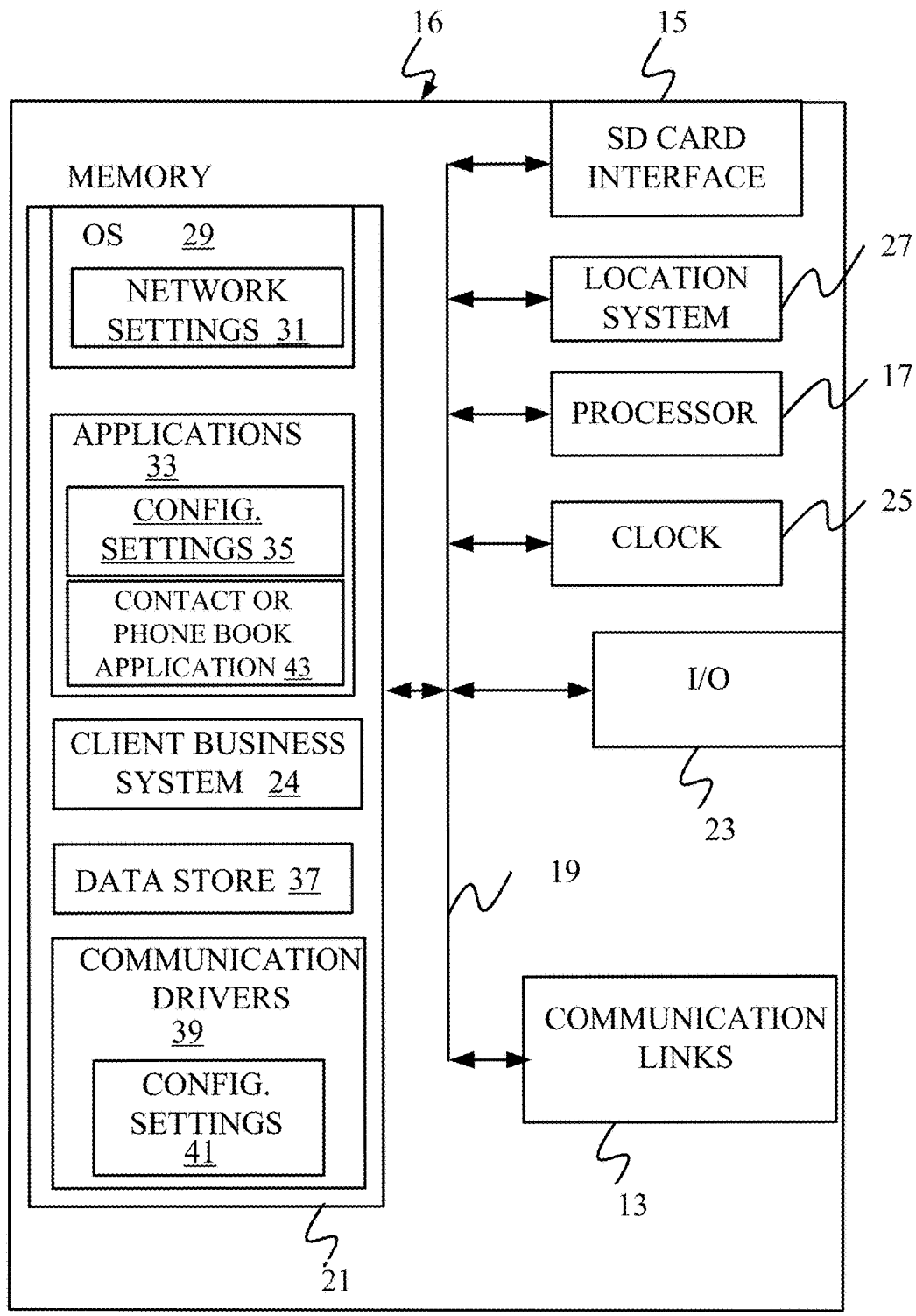
FIGS. 7-11 show various embodiments of mobile devices.

FIG. 7 is a simplified block diagram of one illustrative embodiment of a handheld or mobile computing device that can be used as a user's or client's hand held device 16, in which the present system (or parts of it) can be deployed. FIGS. 9-12 are examples of handheld or mobile devices.

FIG. 7 provides a general block diagram of the components of a client device 16 that can run components of IDE 104 or that interacts with IDE 104, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 126 from FIG. 2)

along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
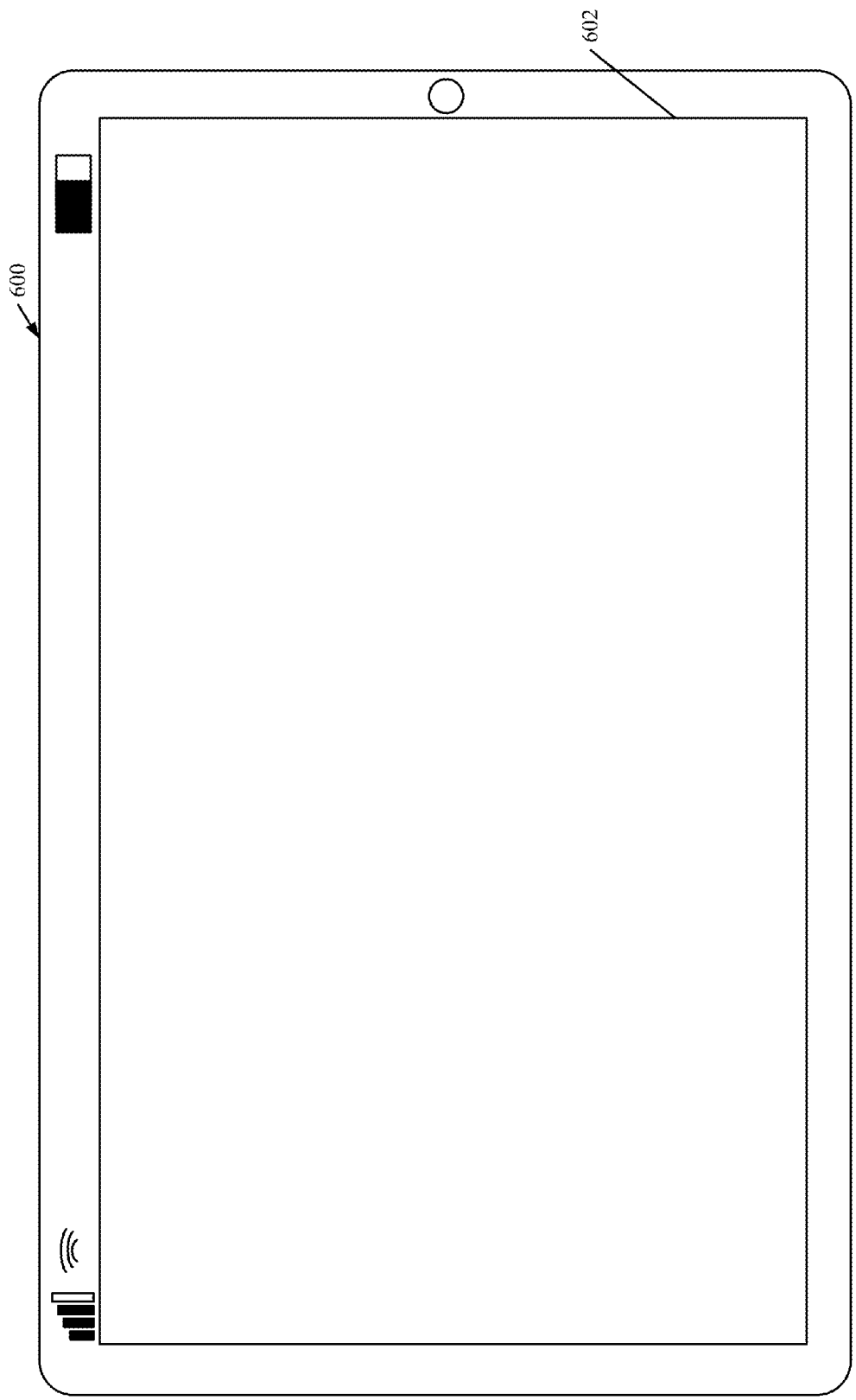

FIG. 8 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
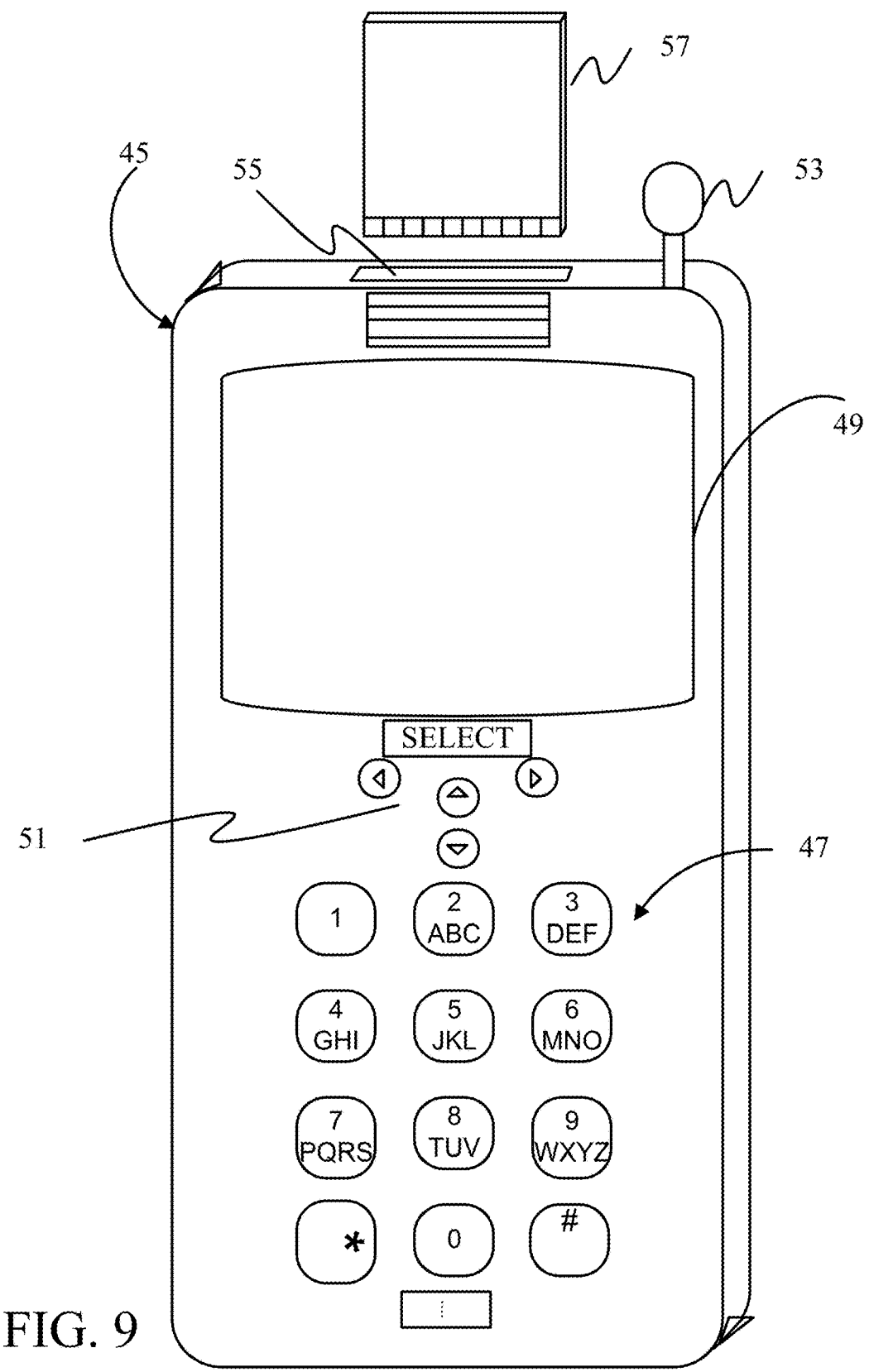
Figure 10:
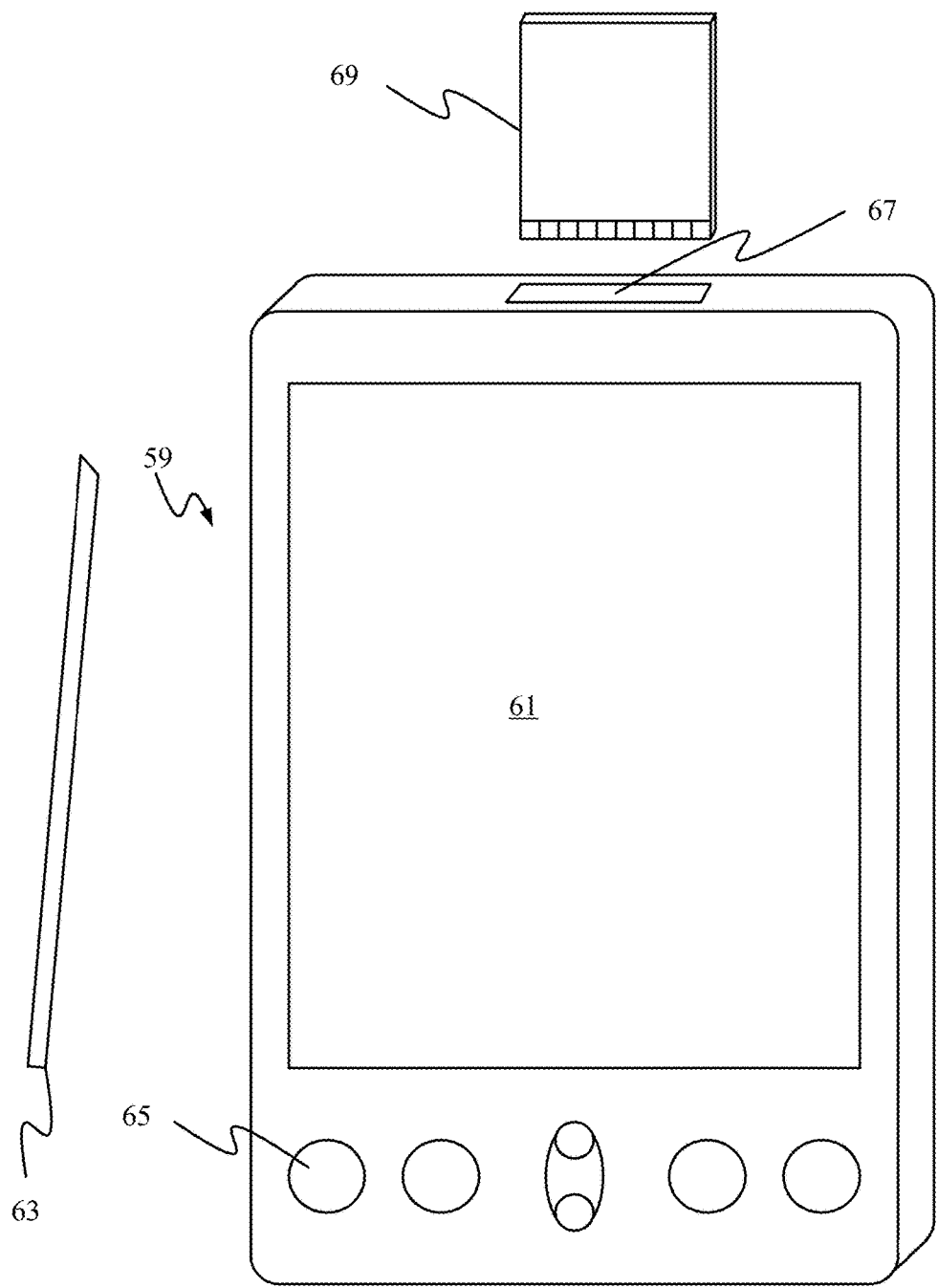

FIGS. 9 and 10 provide additional examples of devices 16 that can be used, although others can be used as well. In FIG. 9, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 11:
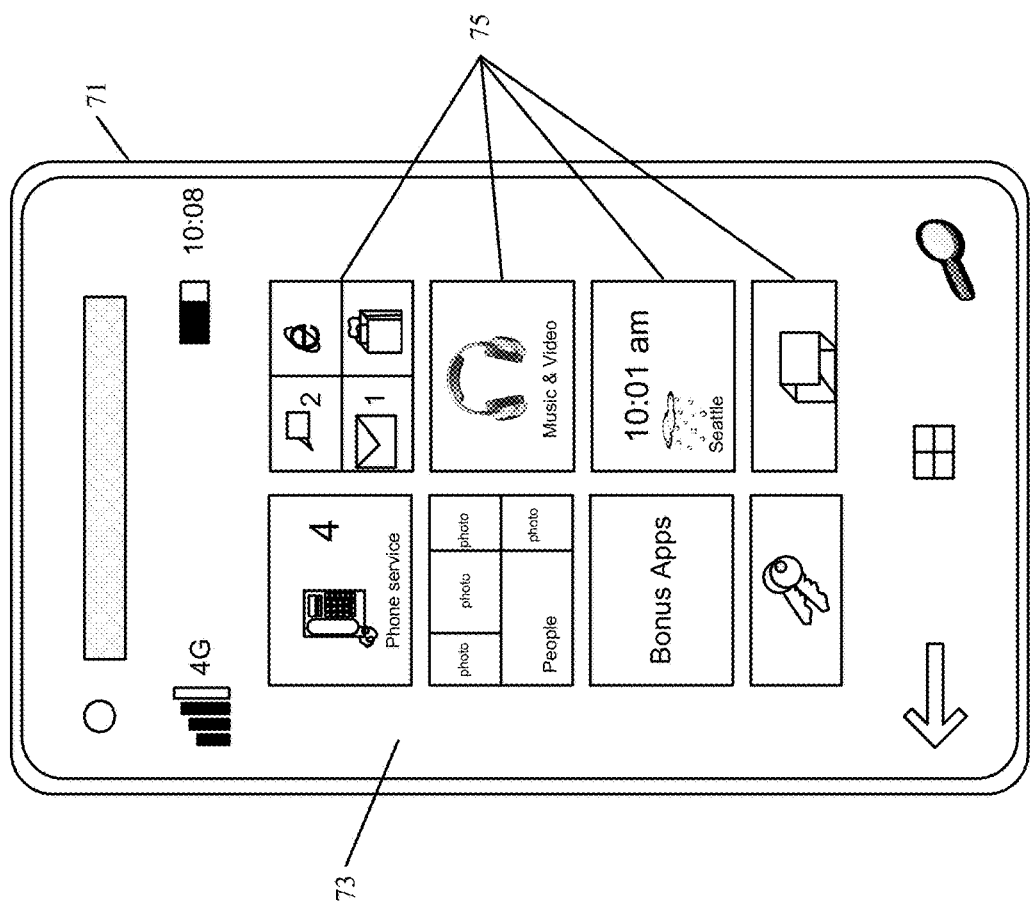

FIG. 11 is similar to FIG. 9 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
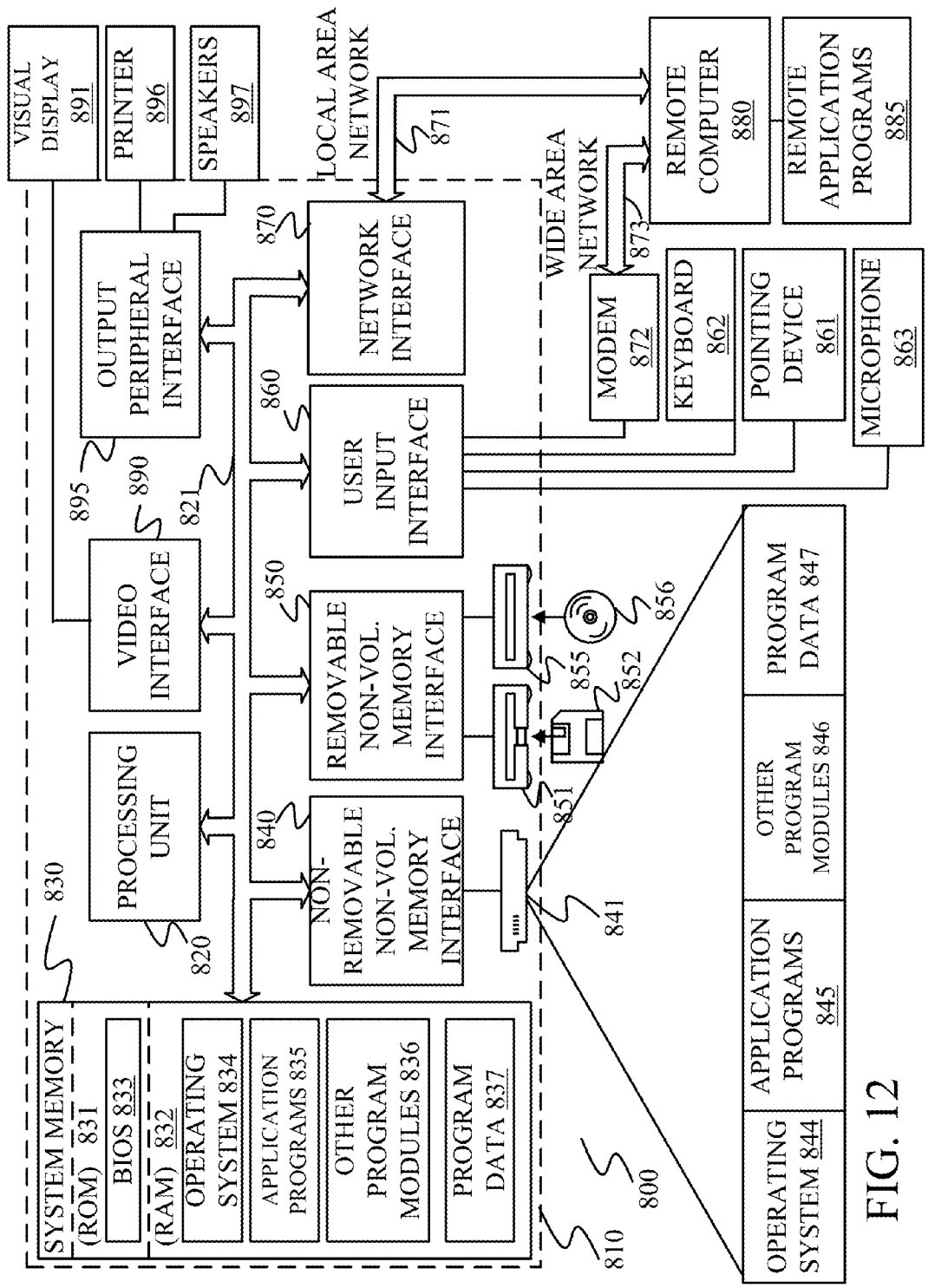
FIG. 12 shows one embodiment of a computing environment.

FIG. 12 is one embodiment of a computing environment in which architecture 100, or parts of it, (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 126), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 2 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
accessing a base system through a development environment;
receiving, using a user interface component of the development environment, a developer extension input indicative of an extension component to add to a corresponding item in metadata, the extension component including an extension property and being a runtime extension to metadata defining the base system;
generating an extension model with the extension component, separate from the base system, modeling the runtime extension to metadata defining the base system;
receiving a developer design time behavior input indicative of design time behavior for the runtime extension in the extension model, the design time behavior input indicating an attribute of the extension property that is a lookup input of the extension component, the lookup input allowing a developer to perform a design time lookup operation with respect to the extension component in the extension model;
modifying the extension model to express the design time behavior for the runtime extension;
accessing the base system and extension model in a subsequent session through the development environment; and
providing the extension model with the expressed design time behavior in the development environment.

2. The computer-implemented method of claim 1 wherein generating an extension model comprises:
generating a build class in application code, the build class having a class attribute and indicating that the item has a corresponding extension component.

3. The computer-implemented method of claim 1 wherein the extension component comprises an extension property and wherein adding the extension component to a corresponding item in metadata comprises:
adding the extension property to the extension model.

4. The computer-implemented method of claim 1 wherein receiving the developer design time behavior input comprises:
receiving a developer component attribute input that indicates an attribute of the extension component in the extension model.

5. The computer-implemented method of claim 1 wherein the item is a form control on a form in a business system.

6. The computer-implemented method of claim 1 wherein receiving developer design time behavior input comprises:
receiving a developer logic input specifying logic for design time behavior of the extension component.

7. The computer-implemented method of claim 6 wherein receiving the developer logic input comprises:
receiving the developer logic input through an extensibility framework.

8. An integrated development environment, comprising:
a processor;
memory coupled to the processor and storing instructions that when executed provide a user interface component and a customization component;
the customization component being configured to receive a base system that has an application element modeled by metadata;
the user interface component being configured to receive a developer extension input that defines a metadata extension to a runtime application element and design time behavior corresponding to the metadata extension, the developer extension input including a lookup input providing a design time lookup operation, the customization component generating an extension model that models the metadata extension and corresponding design time behavior; and
wherein the processor is configured to express the design time behavior in a subsequent design session in the integrated development environment of the extension model.

9. The integrated development environment of claim 8 wherein the base system comprises a business system and wherein the application element comprise an element of the business system.

10. The integrated development environment of claim 9 wherein the customization component generates the extension model to model an extension component that is added to the metadata extension.

11. The integrated development environment of claim 10 wherein the customization component generates the extension model to model design time behavior of the extension component by adding a behavior attribute to the extension component.

12. The integrated development environment of claim 10 wherein the customization component generates the extension model to model an extension property added to the extension component.

13. The integrated development environment of claim 12 wherein the customization component generates the extension model to model design time behavior of the extension property by adding a behavior attribute to the extension property.

14. The integrated development environment of claim 9 wherein the customization component stores the extension model for later use by a development environment.

* * * * *